United States Patent [19]
Woolley

[11] 3,724,279
[45] Apr. 3, 1973

[54] ASSEMBLY FOR MEASURING THE MAGNITUDE OF UNBALANCE IN AN OBJECT

[75] Inventor: Richard P. Woolley, Boulder, Colo.
[73] Assignee: Ball Brothers Research Corporation, Boulder, Colo.
[22] Filed: Sept. 13, 1971
[21] Appl. No.: 179,730

[52] U.S. Cl. .................................................73/462
[51] Int. Cl. ..............................................G01m 1/22
[58] Field of Search..........73/462, 464, 66, 460, 471, 73/472, 474

[56] References Cited

UNITED STATES PATENTS 3,336,809  8/1967  Hack .......................................73/462
3,307,408  3/1967  Thomas et al. ..........................73/462

OTHER PUBLICATIONS

"A Survey of Unbalance Transducers and Indication Systems" by P. K. Trimble, Copyright 1964 (73-66) pages 5, 14, 15 & 16.

Primary Examiner—James J. Gill
Attorney—Robert E. Harris

[57] ABSTRACT

An assembly for measuring the magnitude of unbalance in an object is disclosed herein and, utilizing a conventional spinning device for spinning the object, provides a direct current output signal which is free of noise or other such distortion and which is proportional in magnitude to a given component of unbalance in the object. This is accomplished by exciting a strain-sensitive bridge circuit responsive to the degree of unbalance in the test object with an oscillatory signal synchronous with the spin rate of the object so as to produce a composite signal, which signal is coupled to a damped galvanometer which by averaging the composite signal over a period of time eliminates noise and other distortion components and thereby produces the desired direct current signal.

14 Claims, 6 Drawing Figures

INVENTOR
RICHARD P. WOOLLEY
BY Robert E. Harris
ATTORNEY

INVENTOR
RICHARD P. WOOLLEY
BY Robert E. Harris
ATTORNEY

INVENTOR
RICHARD P. WOOLLEY
BY Robert E Harris
ATTORNEY

ASSEMBLY FOR MEASURING THE MAGNITUDE OF UNBALANCE IN AN OBJECT

BACKGROUND OF THE INVENTION

1. Field of the Invention

This invention relates generally to an assembly for measuring the magnitude of unbalance in an object and more particularly to an assembly which produces a distortion free direct current signal indicative of the degree of component unbalance in the object.

2. Description of the Prior Art

There are many types of object balancing tests and many devices for making such tests. For example, one type of test is to determine whether a given object is balanced about a given axis. In this regard, it has heretofore been the practice to rotatably mount the object on a turntable of a balancing machine so that the given axis of the object is colinear with the axis of rotation. The object is then rotated about the given axis so that the turntable tends to sway or oscillate in synchronism with the speed of rotation if the test object is out of balance about the given axis. By measuring the magnitude of certain radial and torque component forces generated by this tendency to sway or oscillate, the degree of unbalance, which is proportional to the magnitude of these component forces, can be determined.

While the aforedescribed method has been utilized in balance-measuring operations heretofore, a majority of the balancing machines utilized therewith have, due at least in part to electrical distortion in the sensing system being used and the rather small magnitude of the generated forces, been found not to be adequate in detecting and determining the magnitude of the aforesaid component forces and therefore the magnitude of unbalance in a test object. This is especially true when the object is rotated or spun at a low rate of revolutions. On the other hand, those balancing machines which have been found to exhibit adequate degrees of accuracy in detecting and determining unbalance are, however, either expensive and complex or inconvenient to use, especially when testing a large number of different objects at varying spin rates.

Turning briefly to the general types or classifications of balancing machines used heretofore, attention is firstly directed to the "soft-mount" balancing machine which is well-known in the art. This type of machine applies very little force in suspending the test object and turntable so that the spin behavior of the latter is scarcely affected by the suspension system of the balancing machine while the resonant frequency of sway is kept well below the object's spin frequency. As a result, the unbalance forces imparted to the member supporting the object and turntable are usually small regardless of the degree of unbalance.

While the soft-mount balancing machine is somewhat useful for industrial work where the spin rate is high, it is not very practical in many operations such as, for example, those in which the spin rate must be kept relatively low or where a large number of objects are to be tested at different spin rates. For example, the suspension system utilized with this type of machine is inconveniently soft, necessitating change or readjustment for different test objects and/or different spin rates. In addition, the measuring system is either very insensitive due to the aforesaid small forces generated to the suspension system or support member by object unbalance or very expensive requiring complex electronics to sense and amplify these forces as well as to minimize distortion.

A second general type or class of balancing machine is the "resonant-mount" type which, unlike the soft-mount type, displays a resonant frequency of sway which is tuned to the spin frequency of the test object. The manner of suspending the object is such that the turntable sways with large amplitude in response to an unbalance in the test object and is 90° out-of-phase with the unbalanced torque. Since the resonant frequency of sway of any particular object may be different than another object, the suspension system must be tuned for each test object and each spin rate, which is, of course, inconvenient.

A third type of balancing machine is generally characterized as the "hard-mount" type which has a resonant frequency of sway well above the object's spin frequency. The sway amplitude is very small thus forcing the object to spin substantially about its design axis. The spinning object applies sizable forces to a stiffly held suspension system, which forces are generated by and proportional to the magnitude of unbalance in the object. When the suspension system is made stiff enough to operate efficiently, the forces applied thereto are very difficult to sense and the overall measuring system is insensitive. Accordingly, while the hard-mount balancing machine utilized heretofore is convenient in that it does not have to be tuned or adjusted to the specific object being tested or spin rate applied thereto, it requires expensive and complex sensing and amplifying components.

In summarizing the above, all of various types of balancing machines have exhibited certain advantages but all have certain inherent disadvantages. For example, the hard-mount balancing machine is expensive and complex, the resonant-mount balancing machine is inconvenient, especially when testing differing objects at different spin rates, and the soft-mount balancing machine is both expensive and inconvenient. Accordingly, heretofore, there has been no known balancing machine which is both inexpensive and uncomplicated, which is accurate, especially at low spin rate and which is convenient, in that it does not have to be tuned to different test objects and/or spin rates.

SUMMARY OF THE INVENTION

The present invention which provides a heretofore unavailable improvement in devices for determining the state of balance of an object and which incorporates many of the aforedescribed advantages without many of the inherent disadvantages, is directed to an arrangement for producing an output signal proportional to a component of unbalance in an object being tested. This has been achieved by producing a preliminary signal which is responsive to forces created by the unbalance in the object and which includes at least the desired signal component. In response to this preliminary signal, the output signal dependent in magnitude on the desired signal component is produced and thereby represents the desired component of object unbalance.

Accordingly, an object of the present invention is to provide a new and improved assembly for sensing and measuring the degrees of unbalance in an object.

Another object of the present invention is to provide a new and improved balance sensing and measuring assembly which is more accurate, less expensive and simpler in design than those of the prior art.

Still another object of the present invention is to provide a new and improved balance sensing and measuring assembly which is capable of sensing and measuring small degrees of unbalance in an object.

Yet another object of the present invention is to provide a balancing machine, preferably of the hard-mount type, which utilizes a new and improved assembly for sensing and measuring the degree of unbalance in an object.

Still another object of the present invention is to provide a balancing machine which utilizes a new and improved assembly providing electrical output or indication signals representative of the degree of object unbalance, which signals are free of random noise, hum or other such factors otherwise distorting the output signals.

Yet another object of the present invention is to provide a balancing machine utilizing a new and improved assembly which is more accurate, less expensive and simpler in design than those of the prior art and yet which is more convenient in that there is no necessity of returning or readjusting the balancing machine when changing test objects and/or varying the spin rate at which the objects are rotated.

A further object of the present invention is to provide a new and improved assembly for determining the magnitude of a component of unbalance in an object by measuring the magnitude of an electrical signal which is proportional to the magnitude of the component of unbalance sought.

Still a further object of the present invention is to provide a new and improved assembly for determining the magnitude of a component of unbalance in an object by utilizing a reference signal synchronous with the rotation of the object for exciting a bridge circuit including a plurality of strain-sensitive elements, the latter of which are responsive to a pattern of cyclic forces caused by the unbalance of the object, whereby a signal proportional to the magnitude of a component of unbalance in the object is produced.

Yet a further object of the present invention is to provide a new and improved assembly for determining the magnitude of a component of unbalance in an object by producing an electrical output signal that is indicative of the degree of unbalance and yet which is free of random noise, hum or other such factors otherwise causing signal distortion.

These and other objects and features of the present invention will become apparent from the following descriptions.

DETAILED DESCRIPTION

Figure 1:
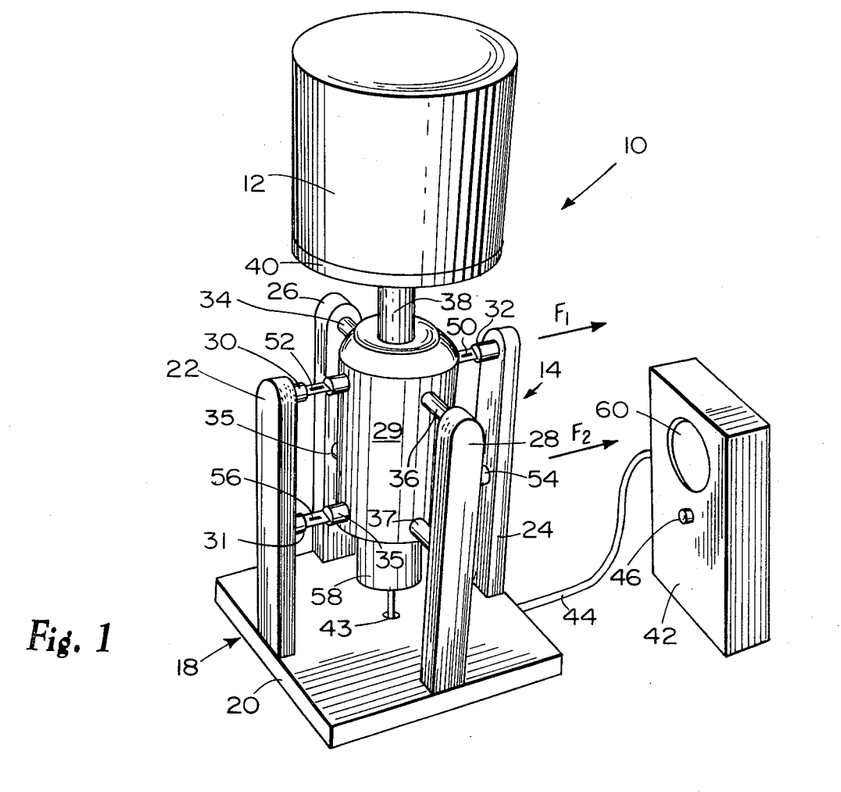
FIG. 1 is a perspective view of an assembly for measuring the magnitude of unbalance in an object, which assembly is constructed in accordance with the present invention.

Turning now to the drawings, wherein like components are designated by like reference numerals throughout the various figures, an assembly 10, constructed in accordance with the present invention and illustrated in FIG. 1, is provided for sensing and measuring the magnitude of unbalance in an object such as, for example, cylindrical object 12. As will be discussed in more detail hereinafter, assembly 10 includes a balancing machine 14 which rotates object 12 about a given axis and at a known spin rate. In the event that there is unbalance about the given axis, the object tends to oscillate or vibrate at a frequency equal to the spin rate, which frequency hereinafter will be referred to as spin rate frequency, and with a magnitude proportional to the degree of unbalance. This oscillation, in turn, imparts a cyclic pattern of forces to the balancing machine, which forces are proportional in magnitude to the degree of object unbalance and which are generally designated by the force vectors $F_1$ and $F_2$ illustrated in FIG. 1.

It should be readily apparent to those skilled in the art that $F_1 + F_2$ is a force due to object unbalance, and $F_1 - F_2$ represents a torque due to object unbalance, the latter taking into account the particular moment arm of the balancing machine 14 causing the torque. It should also be readily apparent to those with ordinary skill in the art that by determining the magnitude of $F_1 + F_2$, and $F_1 - F_2$, the overall unbalance of object 12 may be readily calculated. As will be seen below, assembly 10 is provided for measuring $F_1 + F_2$, and $F_1 - F_2$ in an accurate, inexpensive and uncomplex manner.

Figure 2:
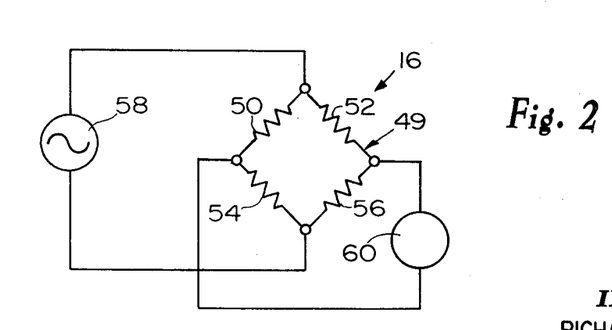
FIG. 2 is an electrical schematic of a sensing and measuring device, utilized with the assembly of FIG. 1.

In order to measure $F_1 + F_2$, and $F_1 - F_2$ (independently), a strain-responsive sensing and measuring device 16, which is constructed in accordance with the present invention and which will be described in more detail with respect to FIG. 2, is provided. As will be seen hereinafter, this device senses and responds to cyclic pattern of forces $F_1 + F_2$ (or $F_1 - F_2$) by producing a direct current output signal which is proportional in amplitude to the peak magnitude of these forces and which is free of noise, hum or other distortion signals which otherwise distort the representative signal so as to make it difficult to provide an accurate reading thereof.

As illustrated in FIG. 1, balancing machine 14 includes a pedestal 18 having base 20 supporting four elongated upwardly extending posts or support members 22, 24, 26 and 28 which are centrally mounted on opposite sides of the base. A variable speed motor 29, which may be energized in any suitable manner such as, for example, electrically, is positioned, preferably centrally, between posts or support members 22, 24, 26 and 28 and slightly above base 20, as illustrated in FIG. 1. The motor is held in place relative to pedestal 18, substantially rigidly so in the case of a hard-mount balancing machine, by two pairs of strain-gage links 30, 31 and 32, 33, which pairs are respectively connected to posts or support members 22 and 24 on opposite sides of motor 29 and two pair of trunion or support links 34, 35 and 36, 37, which pairs are respectively connected to posts or support members 26 and 28 on opposite sides of motor 29, as illustrated in FIG. 1. While four strain-gage links and four trunion or support links are shown, it is to be understood that any suitable number thereof may be utilized so long as the motor is properly supported for imparting the aforestated cyclic pattern of forces to the balancing machine.

A spindle or shaft 38 is rotationally driven by motor 29 and connected to the center of a turntable or object support member 40, the latter of which supports object 12. In this manner, motor 29, which is adjustable in speed, rotates or spins object 12, through spindle 38 and turntable 40, about a given axis and at a known spin rate.

A control console 42, which may be positioned at any convenient location, is connected to motor 29, via conduit 44, extending from the console to the motor through an aperture 43 in the bottom of base 20, for controlling the speed of the motor. In this regard, a spin rate selector switch 46 may be positioned on the face of control console 42 for adjusting the speed of the motor.

As stated above, when rotated at a known spin rate, object 12 and, therefore, spindle 38 and motor 29, tend to oscillate at a frequency equal to or synchronous with the known spin rate and, since motor 29 is substantially rigidly held to posts or support members 22 and 24 by strain-gage links 30, 31 and 32, 33 the tendency to oscillate applies a synchronous cyclic pattern of forces, $F_1 + F_2$ and $F_1 - F_2$ in the case of torque, to the strain-gage links. This, in turn, creates a similar pattern of strain in the links, which pattern, like the pattern of forces, is proportional in magnitude to the degree of component unbalance in object 12.

As illustrated in FIGS. 1 and 2, strain-responsive sensing and measuring device 16 includes a plurality of strain-gage elements 50, 52, 54 and 56 which are respectively mounted to the strain-gage links 32, 30, 33 and 31, in the manner shown in FIG. 1 for sensing the strain therein and which are electrically connected together in bridge arrangement 49, illustrated in FIG. 2, so as to measure, in the first instance, $F_1 + F_2$. A bridge excitation source comprising an alternator 58, driven by motor 29 in synchronism with object 12, is connected to strain-gage bridge 49 for exciting the latter with an oscillatory excitation signal displaying a frequency equal to the aforestated spin frequency. As will be seen hereinafter, the strain-gage bridge, in response to this excitation signal and the degree of unbalance of the bridge, produces a composite signal whose average value is proportional in magnitude to the component of $F_1 + F_2$ that is in phase with the excitation signal.

The composite output signal of strain-gage bridge 49 is applied to a device which filters out all but the direct current of the composite signal such as, for example, a damped galvanometer 60 displaying a natural frequency substantially lower than the spin frequency. In this manner, all of the components making up the composite signal, except the average value indicative of the aforesaid component of $F_1 + F_2$, are eliminated or removed so that the galvanometer clearly indicates the peak magnitude of this force component with the effects of noise and other such distortion factors removed.

As illustrated in FIG. 1, the galvanometer is preferably mounted in console 42 and is connected to the output of the strain-gage bridge by leads extending through conduit 44. In this regard, for purposes of clarity, the various interconnections between strain-gage elements 50, 52, 54 and 56 and alternator 58 are not illustrated in FIG. 1, it being understood that the connections are to be provided in accordance with the schematic displayed in FIG. 2.

Before proceeding to the operation of assembly 10, it is to be understood that the present invention is not limited to the utilization of the specific type of balancing machine illustrated in FIG. 1, that is, a hard-mount type balancing machine, but rather may utilize any suitable balancing machine or no balancing machine at all so long as there is provided the aforedescribed alternating cyclic pattern of strain in response to reciprocation of the object being tested. In addition, while FIGS. 1 and 2 show one strain-gage element for each strain-gage link, it is to be understood that any number thereof may be used. For example, by mounting identical strain-gage elements on opposite sides of each of the strain-gage links and connecting them in series so that they represent a leg of the bridge circuit, it is readily apparent that strain signals indicative of bending strain in the links cancel and are therefore eliminated from the output of strain responsive detecting and measuring device 16.

With assembly 10 constructed in the aforedescribed manner, attention is now directed to the manner and theory in which it operates. Functionally, as partially stated above, the present invention provides direct current output signals, the amplitude of each of which is proportional in magnitude to the magnitude of a component of $F_1 + F_2$ (or $F_1 - F_2$), each of the output signals including substantially no distortion signals such as, for example, slow drifts caused by temperature changes and imperfect initial zeroing, power line hum and its harmonics, as well as other factors caused by random noise and any other signal having a frequency which differs from the aforestated known spin rate frequency. As will be seen hereinafter, these output signals are determined by conducting various tests on the object under consideration utilizing the aforedescribed assembly 10.

Operationally, suppose that balancing machine 14 spins an unbalanced test object at f revolutions per second so that spindle 38 and motor 29 tend to vibrate or oscillate laterally at f cycles per second. This, in turn, generates a cyclic pattern of forces $F_1$ and $F_2$ of the same frequency f and proportional in magnitude to the degree of object unbalance, causing a similar pattern of strain in strain-gage links 30 and 32 Accordingly, the strain-sensitive elements comprising bridge 49 respond to this cyclic pattern of strain so that over a given period of time, sufficiently short so that temperature does not change much, the unbalance U of bridge 49 may be represented by:

$$U = A\sin(2\pi f t) + B\cos(2\pi f t) + c \quad (1)$$

Where C results from the effective temperature and imperfect initial zeroing, $t$ represents time, $f$ represents the aforestated spin rate frequency, that is, the frequency at which the object tends to vibrate or oscillate, and A and B represent the peak amplitudes of the two components making up the bridge unbalance signal and therefore represent $F_1 + F_2$.

Since alternator 58 is driven by and in synchronism with motor 29 and therefore is synchronized with the spin rate of the test object, the excitation signal which is produced thereby, and which will hereinafter be referred to as $e_i$, may be represented by:

$$e_i = E\sin(2\pi ft) \quad (2)$$

where $f$ is the aforestated spin rate frequency and $E$ is the excitation signal amplitude, the latter of which is either known or may be easily determined. As stated above, this signal is provided for exciting strain-gage bridge circuit 49.

Since the signal output of a bridge circuit of the type utilized herein is the mathematical product of excitation voltage and bridge unbalance, the output signal of strain-gage bridge 49, hereinafter referred to as $E_o$, may be represented by:

$$E_o = e_i U = EA\sin^2(2\pi ft) + EB\sin(2\pi ft)\cos(2\pi ft) + EC\sin(2\pi ft) \quad (3)$$

Therefore, the total composite output signal S of bridge circuit 49, including random noise and other distortion factors, may be represented by:

$$S = EA\sin^2(2\pi ft) + EB\sin(2\pi ft)\cos(2\pi ft) + EC\sin(2\pi ft) + [D\sin(2\pi gt) + E\cos(2\pi gt) + \text{other such terms}] + [\text{random noise}] \quad (4)$$

where those terms positioned within square brackets represent the various distortion and irrelevant components of the composite output signal S. Because these components tended to camouflage or obstruct a desired component in a composite signal, heretofore it has been either substantially impossible or expensive to obtain an accurate indication of object unbalance.

Before proceeding, it appears relevant, at this time, to point out various well-known facts which are important in further understanding the operation of the present invention. Specifically, it is well known that both sinusoidal and random oscillatory signals when averaged over a period of time average to zero. It is equally well known that by multiplying a sinusoidal signal with a reference signal of the same frequency and phase, the product will average to a constant direct current signal displaying an amplitude equal to one-half the peak product amplitude. Accordingly, to remove unwanted signal components from a composite oscillatory signal so as to detect a particular component of given phase and frequency, the wanted signal component or, for that matter, the entire composite signal, may be multiplied by a reference signal similar in phase and frequency to the wanted component so that all of the unwanted signals differing in phase or frequency will average to zero, while the wanted signal, as stated above, averages to one-half the product of its amplitude and the amplitude of the reference signal.

Therefore, the composite output signal S, which, as stated above, is a product of this type of multiplication, is applied to an averaging device such as, for example, galvanometer 60. By utilizing a damped galvanometer having a natural frequency low compared to the aforestated frequency $f$, the galvanometer averages each of the terms or components of composite signal S. In this manner, each of these terms, as stated above, averages to zero, except for the first term which represents the product of the aforestated wanted signal component and reference signal, so that the reading of galvanometer 60 is:

$$S_{avg.} = \tfrac{1}{2} EA \quad (5)$$

which is proportional to the peak magnitude A of the sine component of $F_1 + F_2$. By exciting the strain-gage bridge with a signal:

$$e_i = E\cos(2\pi ft) \quad (6)$$

it is readily apparent that:

$$S_{avg} = \tfrac{1}{2} EB \quad (7)$$

which is proportional to the cosine component of $F_1 + F_2$, may be obtained. Since E is known, these two measurements upon appropriate calibration or calculation give the peak amplitude of the aforestated unbalance signal U, with all the distortion factors, such as noise and hum, removed and, therefore, give the force due to unbalance in the test object. In a similar way, this technique removes the effects of real strain at frequencies other than F.

By interchanging strain-gage elements 54 and 56 in bridge 49 and by following the procedures described hereinabove, the magnitude of $F_1 - F_2$ may be determined, giving the two components of the torque due to unbalance in the test object. Once the values of $F_1 + F_2$ and $F_1 - F_2$ are determined, they may be utilized in a known manner for calculating the overall unbalance in the test object. Accordingly, the galvanometer displays a true and accurate reading of object unbalance without the necessity of expensive and complex electronic equipment. In this regard, while $F_1 + F_2$ and $F_1 - F_2$ have been determined utilizing assembly 10, it is to be understood that it is well within the skill of the art to determine $F_1$ and $F_2$ separately by using the aforedescribed principles.

Figure 3:
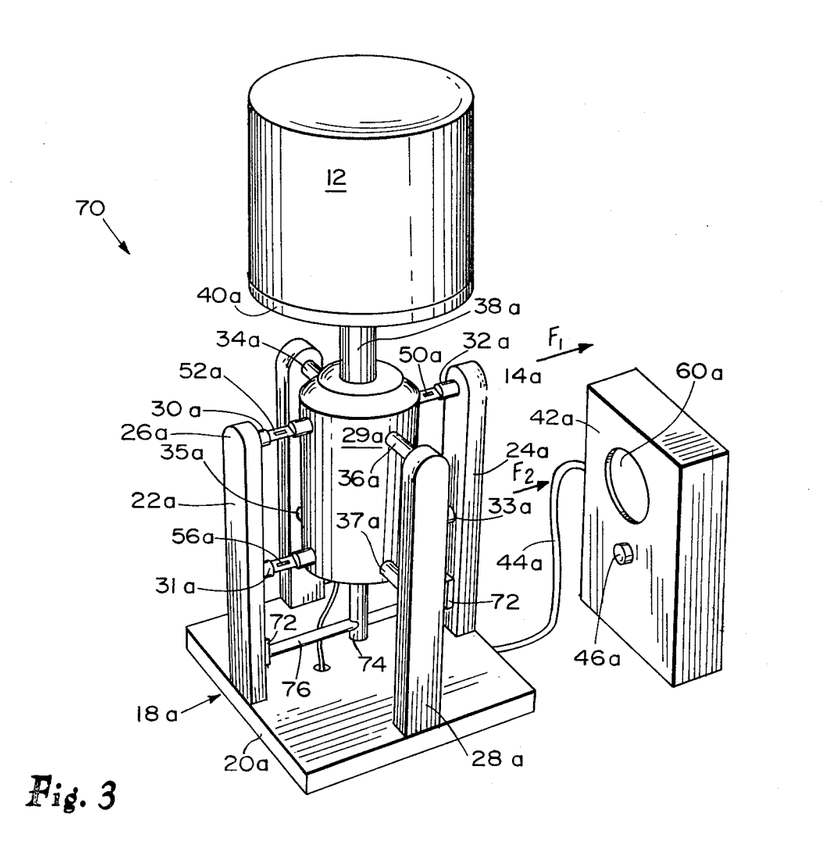
FIG. 3 is a modified embodiment of the assembly illustrated in FIG. 1, and constructed in accordance with the present invention.
Figure 4:
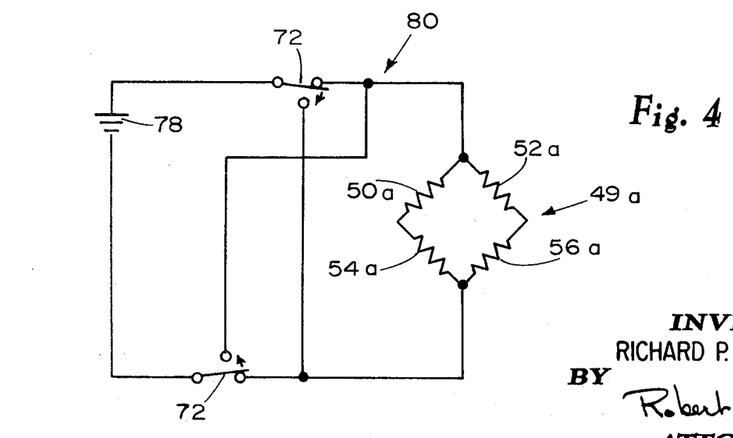
FIG. 4 is an electrical schematic of a modified sensing and measuring device utilized with the assembly illustrated in FIG. 3.

Turning to FIGS. 3 and 4, attention is directed to a second embodiment 70 of an assembly which is provided for sensing and measuring the magnitude of unbalance in an object such as, for example, object 12, and which is constructed in accordance with the present invention. Because assemblies 10 and 70 include similar components, those components which are similar will be designated by like reference numerals, the suffix letter $a$ being provided for designating the similar components of assembly 70. In addition, because the similar components operate in substantially the same manner, further descriptions or operational discussions thereof will not be necessary, reference being made to the above description of assembly 10.

Assembly 70 is provided for the same purposes as the aforedescribed assembly 10, that is, to produce signals at the output of galvanometer 60a which together are indicative of overall unbalance in the object being tested with noise and other distortion signals removed. However, it has been found that if the object under observation is rotated at a slow spin rate, the motor, driving the object, is not capable of effectively driving an alternator for producing the aforedescribed excitation signal. Accordingly, in the assembly of embodiment 70, the alternator described with respect to assembly 10 has been replaced with an assembly of reversing switches 72 which are mounted to the inside surface of posts or support members 22a and 24a, as illustrated in FIG. 3.

A shaft or spindle 74 is provided and extends downwardly from and is driven by motor 29a. The shaft includes two outwardly extending and aligned switch arms 76 which extend outwardly a sufficient distance so as to engage and reverse the states of switches 72 as the switch arms are driven past the latter. In this manner, the switches reverse states each half revolution of object rotation, that is, each half-cycle, so as to produce a square wave excitation signal, as will be seen below.

As illustrated in FIG. 4, the reversing switches 72 are connected between a preferably highly regulated DC power supply 78 and the input of bridge circuit 49a, all of which make up a modified embodiment 80 of the aforedescribed device 16. It should readily be apparent that as the object is rotated at a particular spin rate, the reversing switches 72 oscillate between positions at a frequency equal to the spin rate for converting the direct current into a square wave excitation signal of the same frequency, which signal is applied to the input of bridge circuit 49a in the same manner as the aforedescribed excitation signal e.

The results obtained in utilizing reversing switches 72, as opposed to the aforedescribed alternator 58, are substantially the same. The effects of real strains displaying various harmonic spin rate frequencies are not completely removed, but it has been found that these do not, in any substantial way, affect the accuracy or reliability of the assembly.

With assemblies 10 and 70 constructed in the aforedescribed manner, attention is now directed to a working embodiment of the present invention, which embodiment included a hard-mount balancing machine having a pedestal twenty inches in diameter and forty-three inches high, as well as the other components described hereinabove. While the working embodiment has been tested as spin rates between 30 rpm and 180 rpm, it is to be understood that any reasonable spin rate may be applied to the object under observation.

At, for example, 60 rpm, it has been found that this working embodiment can detect 3-ounce inches static unbalance or 100-ounce inches$^2$ dynamic unbalance. In addition, at this spin rate, it has been found capable of handling a test object weighing 500 pounds with its center of gravity 4 feet above the pedestal, or a test object weighing 2,000 pounds with its center of gravity 1.5 feet above the pedestal. Generally, the assembly constructed in accordance with the present invention has been found to resolve strains of one part in one hundred million. Such load capacity and sensitivity is thought not to have been achieved with ordinary strain-gage methods or any other balancing technique known, heretofore.

Figure 5:
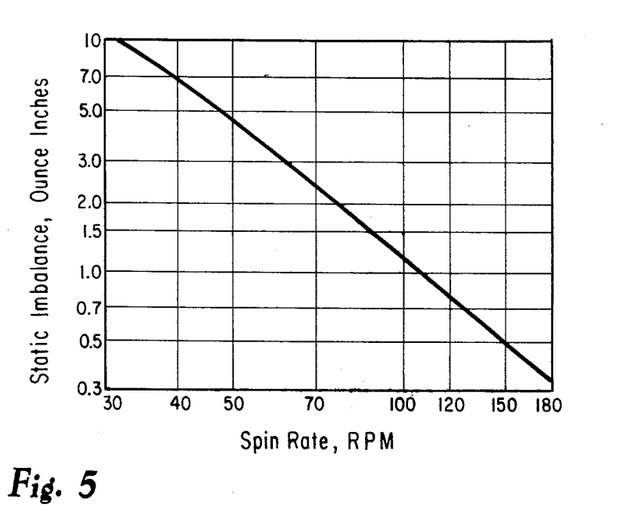
FIGS. 5 and 6 are graphs illustrating the capability of a working embodiment of the present invention.
Figure 6:
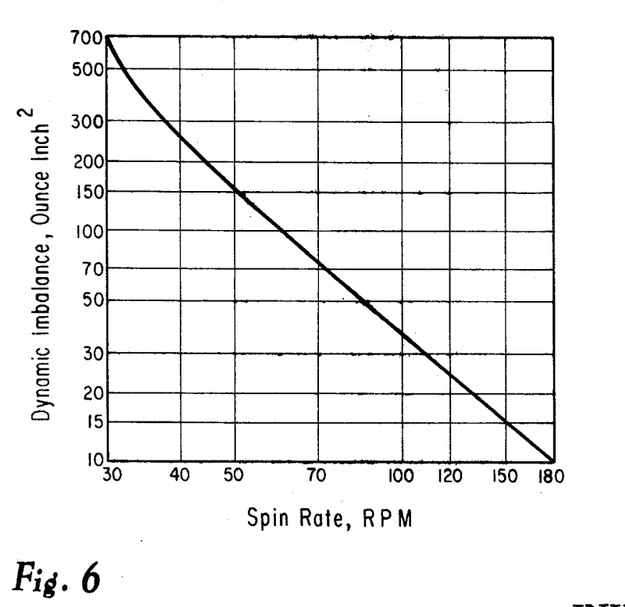

As an illustration of the overall achievement of the working embodiment of the present invention, attention is directed to FIGS. 5 and 6 which comprise cartesian graphs illustrating the static and dynamic balancing accuracy of this working embodiment at the various spin rates provided thereto. In each of these graphs, the X-axis represents the spin rate, in revolutions per minute, at which the test object is rotated. The Y-axis of FIG. 5 represents the maximum amount of static unbalance in ounce inches (oz.-in.) that might exist in the object when the balancing assembly of the present invention indicates that it is balanced and the Y-axis of FIG. 6 represents the maximum amount of dynamic unbalance in ounce inches$^2$ (oz.-in.$^2$) that might exist when the balancing assembly indicates that it is balanced.

As illustrated in FIG. 5, at 60 rpm, the amount of static unbalance not detected is no greater than 3 oz.-in. and at 150 rpm, the static unbalance not detected is no greater than 0.5 oz.-in., these being only a few of many measurements illustrated in FIG. 5. As illustrated in FIG. 6, at 60 rpm, the amount of dynamic unbalance not detected is no greater than 100 oz.-in.$^2$ and at 150 rpm, the dynamic unbalance not detected is no greater than 15 oz.-in.$^2$, these being only a few measurements illustrated in FIG. 6.

It is to be understood that the above figures cited with respect to the aforedescribed working embodiment are provided merely for purposes of illustrating the general accuracy of the invention disclosed herein and are not intended to limit its scope in any manner.

While sensing and measuring devices 16 and 80 have been described in combination with balancing machines 14 and 14a, it is to be understood that the same may be used independently thereof. For example, if one desires to measure the motion in a swaying object such as, for example, a swaying building, the invention herein disclosed may be utilized for this purpose. Specifically, by mounting the aforedescribed strain-gage elements to the swaying object and by exciting the bridge circuit making up the strain-gage elements with a signal having a particular phase and frequency, the galvanometer output will produce a constant signal proportional in amplitude to the component of motion which is synchronous with that phase and frequency.

Although two embodiments of the present invention have been illustrated and described, it is anticipated that various changes and modifications will be apparent to those skilled in the art, and that such changes may be made without departing from the true scope of the present invention as defined by the appended claims.

What is claimed is:

1. A device for producing and determining the magnitude of a signal component proportional to a component of unbalance in an object, said device comprising: means for producing an excitation signal synchronous with rotation of the object; circuit means including a plurality of strain responsive elements connected together in a bridge arrangement and responsive to said excitation signal and to strain forces caused by the unbalance of said object for producing an output signal having at least said signal component proportional to said component of unbalance; and means connected with said circuit means and responsive to said output signal for producing an indication signal representative of substantially only the signal component proportional to said component of unbalance whereby said component of unbalance can be determined.

2. A device for determining the magnitude of a component of unbalance in an object, said device comprising: means for producing an excitation signal synchronous with rotation of the object; circuit means including a plurality of strain responsive elements connected together in a bridge arrangement and responsive to said signal and to strain caused by the unbalance of said object for producing an output signal having at least a signal component proportional to the magnitude of said component of unbalance.

3. A device according to claim 2 including means connected with said circuit means and responsive to said output signal for producing an indication signal that indicates the peak magnitude of said component of unbalance.

4. A device for determining the relative magnitude of a component of unbalance in an object, said device comprising: means for producing an excitation signal synchronous with rotation of the object; circuit means including a plurality of strain responsive elements connected together in a bridge arrangement, said elements being responsive to said excitation signal and responsive to strain which is caused by the unbalance in said object and which causes proportional unbalance in said bridge for producing an output signal which is the product of said excitation signal and degree of unbalance of said bridge, said output signal including a signal component proportional in amplitude to the magnitude of said component of unbalance.

5. A device according to claim 4 including indication means connected to the output of said circuit means and responsive to said output signal for producing a direct current signal proportional to the magnitude of said component of unbalance.

6. A device according to claim 5 wherein said indication means includes means for averaging said output signal over a period of time whereby each signal component included therewith, except said direct current signal component, averages to zero.

7. A measuring device for determining a component of unbalance in a moving object which generates a cyclic pattern of forces proportional to the magnitude of the component of unbalance, said measuring device comprising: means responsive to strain cuased by the cyclic pattern of forces for producing an output signal having at least a direct current signal component proportional to the magnitude of said component of unbalance, said means including a bridge circuit having a plurality of strain responsive elements responsive to said strain and signal providing means providing an excitation signal synchronous with said cyclic pattern for exciting said bridge circuit; and, indication means connected with said last-mentioned means and responsive to said output signal for eliminating substantially all signal components except a direct current signal substantially proportional in magnitude to the said component of unbalance in an object.

8. A measuring device according to claim 7 wherein said signal providing means includes an alternator connected with said moving object for producing said synchronous excitation signal.

9. A measuring device according to claim 7 wherein said signal providing means includes a plurality of reversing switches adapted to be connected to a direct current source and responsive to the movement of said object for providing said synchronous excitation signal.

10. An assembly for measuring the magnitude of a component of unbalance in an object, said assembly comprising: means for supporting said object; means imparting motion to said object for generating a cyclic pattern of forces proportional to the magnitude of unbalance; means responsive to the cyclic pattern of forces for producing an output signal having at least a direct current signal component proportional to the magnitude of said component of unbalance in said object said output signal producing means including a bridge circuit having a plurality of strain responsive elements responsive to strain caused by said cyclic pattern of forces for determining the state of balance of said bridge circuit and signal providing means providing an excitation signal synchronous with said cyclic pattern for exciting said bridge circuit; and indication means connected with said last-mentioned means and responsive to said output signal for eliminating substantially all signal components except said direct current signal whereby said indication means indicates the magnitude of said component of unbalance in said object.

11. An assembly according to claim 10 wherein said motion imparting means includes a motor and wherein said signal providing means includes an alternator connected with and driven by said motor for providing said synchronous excitation signal.

12. An assembly according to claim 10 wherein said signal providing means includes a plurality of reversing switches adapted for connection with a direct current source and responsive to the motion of said object for providing said synchronous excitation signal.

13. An assembly for measuring the magnitude of dynamic unbalance in an object, said assembly comprising: a support member; a motor positioned adjacent said support member; linking means connected with said support member and said motor for substantially rigidly supporting said motor relative to said support member; a turntable adapted to support said object; a spindle connected to said turntable and driven by said motor for rotating said object about a given axis whereby unbalance in said object about said axis generates a proportional cyclic pattern of forces in said linking means; means responsive to the strain in said linking means caused by said forces for producing an output signal having at least a direct current component proportional to the magnitude of a component of unbalance in said object, said last-mentioned means including a bridge circuit having a plurality of strain responsive elements mounted to said linking means and responsive to the strain in said linking means caused by said forces for determining the state of balance of said bridge circuit and signal providing means connected with said bridge circuit and providing an excitation signal synchronous with said cyclic pattern for exciting said bridge circuit; and a damped galvanometer connected with said bridge circuit and responsive to said output signal for providing an indication signal substantially proportional in amplitude to said direct current signal component.

14. A device for measuring the magnitude of cyclic pattern of forces in an object, said device comprising: a bridge circuit including force responsive means connected with said object whereby at any instant the state of balance of said bridge circuit is proportional to the magnitude of the cyclic pattern of forces in said object at that instant; means connected with said bridge circuit and producing an oscillatory signal having a frequency equal to said cyclic pattern, said signal being provided for exciting said bridge circuit whereby said bridge circuit produces an output signal which is the product of said oscillatory signal and the state of balance of said bridge; and means connected with said bridge circuit for averaging the output signal over a period of time whereby all of the components making up said output signal except the direct current component average to zero, said direct current component being proportional to that component of the cyclic pattern of forces that has the same frequency and phase as said oscillatory signal.

* * * * *